US006716081B2

(12) United States Patent
Kim et al.

(10) Patent No.: US 6,716,081 B2
(45) Date of Patent: Apr. 6, 2004

(54) SPACER FABRICATION FOR FLAT PANEL DISPLAYS

(75) Inventors: Won-Joo Kim, Boise, ID (US); Robert J. Hanson, Boise, ID (US); David H. Chun, Boise, ID (US); Gary A. Evans, Eagle, ID (US); Seungwoo Lee, Boise, ID (US); Jim J. Browning, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/113,044

(22) Filed: Apr. 1, 2002

(65) Prior Publication Data

US 2002/0111104 A1 Aug. 15, 2002

Related U.S. Application Data

(62) Division of application No. 09/514,962, filed on Feb. 29, 2000.

(51) Int. Cl.[7] .......................... H01J 9/24; C04C 27/06; C04C 15/00; B44C 1/22

(52) U.S. Cl. ......................... 445/66; 428/188; 428/209; 428/210; 428/631; 216/12; 216/41; 216/56

(58) Field of Search ................................ 428/188, 209, 428/210, 631; 216/12, 56, 41; 445/66

(56) References Cited

U.S. PATENT DOCUMENTS 5,688,408 A * 11/1997 Tsuru et al. .................. 216/17
5,708,325 A * 1/1998 Anderson et al. ........... 313/292
5,717,287 A * 2/1998 Amrine et al. ................ 445/24
5,980,346 A * 11/1999 Anderson et al. ............ 445/24
5,980,349 A 11/1999 Hofmann et al.
6,004,179 A * 12/1999 Alwan ......................... 445/24
6,103,135 A * 8/2000 Kusner et al. ................ 216/20
6,245,249 B1 * 6/2001 Yamada et al. ............... 216/33
6,315,397 B2 * 11/2001 Truninger et al. ............ 347/63
6,416,374 B1 * 7/2002 Mitome et al. ................ 445/6

* cited by examiner

*Primary Examiner*—Kenneth J. Ramsey
(74) *Attorney, Agent, or Firm*—TraskBritt

(57) ABSTRACT

A multi-layered structure, and method for producing same, which may include at least one glass layer anodically bonded to an intermediate layer. The intermediate layer may function as an anodic bonding layer, an etch stop layer, and/or a hard mask layer. A template may be formed of the multi-layered structure by forming a desired pattern of openings therein by way of, for example, etching. Such a template may, for example, be used in the alignment and adherence of spacer structures to an electrode plate during the fabrication of flat panel displays. When used in this context, the construction of such a template results in more precise control of the patterning and sizing of the holes formed therein which thereby allows for more precise placement of spacer structures as well as the use of spacer structures exhibiting relatively higher aspect ratios during the fabrication of flat panel displays.

13 Claims, 4 Drawing Sheets

SPACER FABRICATION FOR FLAT PANEL DISPLAYS

CROSS-REFERENCE TO RELATED APPLICATION

This application is a divisional of application Ser. No. 09/514,962, filed Feb. 29, 2000, now U.S. Patent 6,413,135, issued Jul. 2, 2002.

BACKGROUND OF THE INVENTION

1. Field of the Invention

This invention relates to flat panel display devices generally and, more particularly, to processes for creating a template to align and adhere spacer structures which will provide support against the atmospheric pressure on a flat panel display without impairing the resolution of the image.

2. State of the Art

In flat panel displays of the field emission type, an evacuated cavity is maintained between the cathode electron-emitting surface and its corresponding anode display face. Spacer structures incorporated between the display face and the baseplate perform this function.

In order to be effective, spacer structures must possess certain characteristics. The spacer structures must be sufficiently non-conductive in order to prevent catastrophic electrical breakdown between the cathode array and the anode. In addition, they must exhibit sufficient mechanical strength to prevent the flat panel display from collapsing under atmospheric pressure. Furthermore, they must exhibit stability under electron bombardment, as electrons will be generated at each pixel location within the array. The spacer structures must be capable of withstanding "bake-out" temperatures of about 400° C. that are likely to be used to create the vacuum between the screen and baseplate of the display. The spacers must also be sufficiently small in cross-sectional area, so as to be invisible during display operation.

It has been a challenge in the development of field emission displays (FED) to fabricate spacer structures because of the complex functional requirements they must possess.

Known methods using screen-printing, stencil printing, or glass balls do not provide a spacer having a sufficiently high aspect ratio. The spacers formed by these methods either cannot support the high voltages, or interfere with the display image. Other methods involving the etching of deposited materials suffer from slow throughput (i.e., time length of fabrication), slow etch rates, and etch mask degradation. The use of lithographically defined photoactive organic compounds results in the formation of spacers which are incompatible with the high vacuum conditions and elevated temperatures characteristic in the manufacture of field emission displays (FED).

Methods which employ the use of templates to align and attach the spacer structures to one of the electrode plates of the display have several drawbacks. The templates themselves are not refined enough to maintain the spacer in a sufficiently vertical position for attachment to the display electrode. Further, the prior art methods disclose the use of a sponge to apply an adhesive, such as glue, to the exposed ends of the spacers. The spacers are then mechanically aligned to an electrode plate to which they are attached. The glue emits a gas during subsequent processing, thereby contaminating the system.

Accordingly, there is a need for a high aspect ratio spacer structure for use in a FED, and an efficient method of manufacturing a FED with such a spacer.

BRIEF SUMMARY OF THE INVENTION

One aspect of the present invention provides for a multi-layered template and includes the process for manufacturing such a template. The multi-layered process comprises anodically bonding at least one etch stop layer to at least one glass layer; patterning the layers; and then etching the layers to form an opening. This process can be repeated several times before disposing a spacer structure within the opening in the substrate.

Another aspect of the present invention comprises the process of using a multilayered template having a spacer structure disposed therein to align the spacer structure to an electrode plate of a display device. The spacer can then be adhered to the baseplate or faceplate of the display through the use of an adhesive or, alternatively, by anodic bonding.

A further aspect of the present invention comprises the process of using a template having a spacer structure vertically disposed therein while anodically bonding the spacer structure to the faceplate or baseplate.

BRIEF DESCRIPTION OF THE SEVERAL VIEWS OF THE DRAWINGS

The present invention will be better understood from reading the following description of nonlimitative embodiments, with reference to the attached drawings, wherein below.

DETAILED DESCRIPTION OF THE INVENTION

Figure 1:
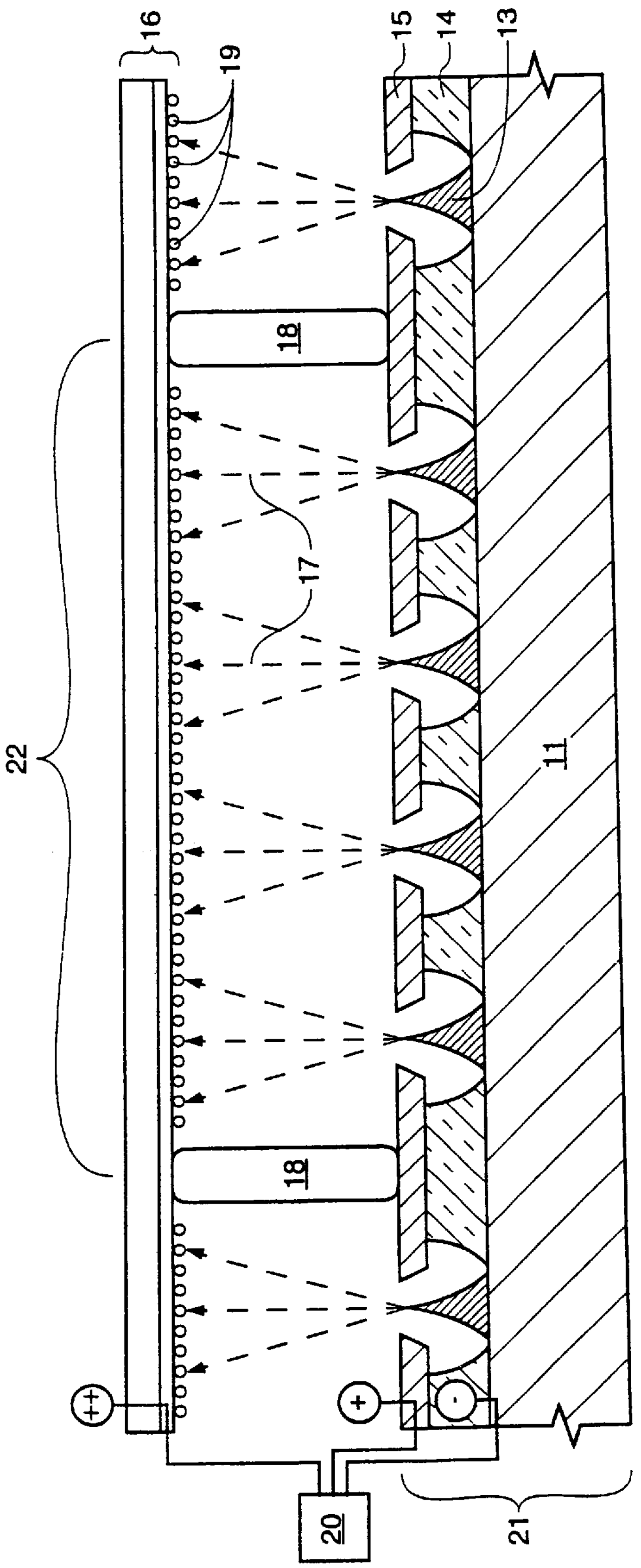
FIG. 1 is a schematic cross-section of a representative pixel of a field emission display comprising a faceplate with a phosphor screen, vacuum sealed to a baseplate which is supported by spacer structures.

Referring to FIG. 1, a representative field emission display employing a display segment 22 is depicted. Each display segment 22 is capable of displaying a pixel of information. A black matrix (not shown) or grille surrounds the segments for improving the display contrast. Gate 15 serves as a grid structure for applying an electrical field potential to its respective cathode 13. When a voltage differential, through source 20, is applied between the cathode 13 and the grid 15, a stream of electrons 17 is emitted toward a phosphor 19 coated faceplate 16, sometimes referred to as a screen. A dielectric insulating layer 14 is deposited on the conductive cathode 13.

Disposed between the faceplate 16 and the baseplate 21 are spacer support structures 18. The spacer support structures 18 function to support the atmospheric pressure which exists on the electrode plates 16, 21 as a result of the vacuum which is created between them for the proper functioning of the display.

For a discussion of one method for the preparation and attachment of fibers useful as spacers, see for example, U.S. Pat. No. 5,980,349, entitled "Anodically-Bonded Elements for Flat Panel Displays" which is commonly owned with the present application, and is hereby incorporated by reference as if set forth in its entirety.

Figure 2:
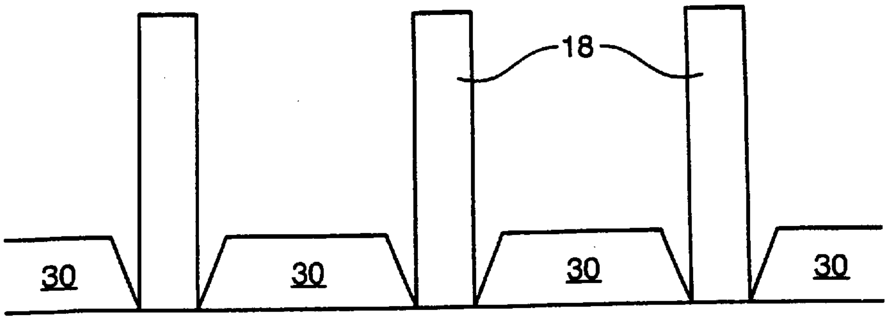
FIG. 2 is a schematic cross-section of a representative template having a spacer structure disposed therein.

Referring to FIG. 2, the process of the present invention employs a template, generally represented by 30, which is used to pre-align the spacer structures 18 before further processing is carried out. The template 30 has one or more apertures in which the spacer structures 18 are disposed and held at an angle substantially perpendicular thereto. The spacers structures 18 of the present invention are preferably formed from glass fibers which have been drawn and pre-cut to the desired diameter and length. The pre-cut spacer fibers are strewn about the top surface of the template, and a vacuum is applied to the underside. The vacuum, applied to the underside of the template, randomly pulls fibers into the template apertures where the spacer fibers are held in an upright position by gravity and by the sides of the template apertures themselves.

As the height of the final spacer structures 18 is increased, the height or thickness of the template 30 must likewise be increased in order to physically maintain the fiber/spacer structure 18 in a vertical position. The preferred template 30 height is approximately 60% of the height of the spacer structure 18. Currently, process dimensions require a template to have a height of between 150–250$\mu$.

Using conventional processes, such as a simple wet etch, it is currently very difficult to control the size of the template apertures in which the spacers are mechanically held. This is due to the wet etch characteristics of the template material, which is usually some type of glass that has been patterned with a photo-lithographic mask commonly used in the art.

The isotropic nature of the wet etch causes removal of material at substantially the same rate in both the vertical and horizontal directions, thereby creating a characteristic "undercut" profile. The longer the duration of the etch, the greater the undercut. A typical wet etch used in such a process would be a buffered oxide etch or a hydrogen fluoride (HF) dip. The template structure and its corresponding aperture shown in FIG. 3 represent the result achieved with the prior art method employing a single sheet of glass as a template.

Figure 3:
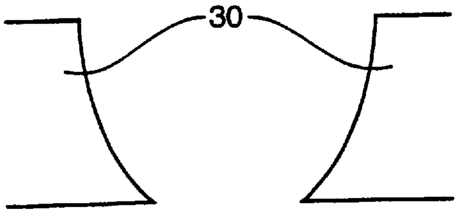
FIG. 3 (PRIOR ART)
FIG. 3 is a schematic cross-section of a single layer template of the prior art.
Figure 4:
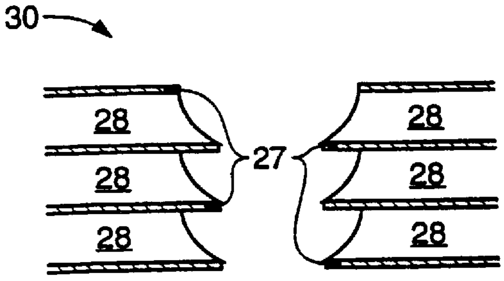
FIG. 4 is a schematic cross-section of a template formed according to the process of the present invention.

Comparing FIGS. 3 and 4, the differences in results between a conventional wet etch and the process of the present application become apparent. The use of a multi-layered structure, as in the present invention, provides for more control over the size of the template apertures than the single layered structure of the prior art.

The process of the present invention permits more precise control over the size of the template apertures in the glass through a unique combination of anodic bonding, photolithography, and etch processes. Anodic bonding is one method whereby glass material may be bonded to an oxidizable material (e.g., a metal or silicon) or another glass material. During anodic bonding, heat is applied to the materials which are to be bonded. Oxygen ions in the heated glass material are drawn across a junction (where the two materials contact each other) to form a chemically bonded oxide bridge between the two materials.

To draw the oxygen ions across the junction between the materials, an electrical field typically is applied to the materials to create a flow of charge through them. The materials are heated until the alkali and alkaline earth ions become mobile allowing non-bridging oxygen ions to diffuse as well. In this manner, negatively charged oxygen ions flow in one direction across the junction, and positively charged ions (e.g., alkali ions, such as sodium and lithium) flow in the opposite direction across the junction.

FIG. 4 illustrates the process of the present invention, in which one or more intermediate layers 27 are used between thin sheets of glass 28 which have been anodically bonded together to form a multi-layered template 30.

The height of the template 30 which is needed to hold the spacer structures 18 erect and the thickness of the glass sheets will determine the number of sheets of glass 28 to be used. For example, if 210$\mu$ is the recommended thickness for the template 30, three sheets of glass 28, each having a thickness of 70$\mu$, would be anodically bonded (triple stacks of bonding) before patterning of apertures (or, alternatively, after patterning of apertures). Likewise, five sheets of glass 28, each having a thickness of 42$\mu$, could alternatively be used.

The glass sheet layer 28 contains mobile ions, such as, for example, sodium, potassium, lithium, and similar elements. Further, the type of glass employed in the process of the present invention preferably has a coefficient of thermal expansion similar to the substrate used to fabricate the electrode plates to which the spacer structures 18 will be ultimately be attached. An example of a material which both contains the mobile ions suitable for glass sheet layer 28, as well as the desired coefficient of thermal expansion is soda lime silicate glass.

The layers 27 disposed between the sheets of glass 28 include, but are not limited to, one or more of the following: an intermediate anodic bonding layer; an etch stop layer, and/or a hard mask layer. A single film layer 27 disposed between adjacent glass sheets 28 can perform all of the above-listed functions. Alternatively, multiple layers 27 can be used. Layers 27 are preferably comprised of any type of material which forms a stable oxide, such as, for example, silicon, which can be amorphous silicon, polysilicon, crystalline silicon, or other such material.

An illustrative example is the use of a single layer 27 of amorphous silicon, which can function as an anodic bonding layer, as silicon forms a stable oxide. Additionally, it can also function as an etch stop layer and a mask layer, as silicon is selectively etchable with respect to glass. The role/or roles that the silicon layer 27 will play depends on the amount of material deposited, and the amount consumed during the anodic bonding process.

For example, if a 1.5 $\mu$m silicon layer 27 is disposed on each side of each glass sheet layer 28, and during the process of anodic bonding the glass sheets together, all of the silicon is oxidized to form 3 pm of silicon dioxide, then layer 27 functions only as an anodic bonding layer. This is so because during the wet etch process, the etchant, HF for example, will remove all of the silicon dioxide and continue to etch the underlying glass sheet layer 28, as oxide is not selectively etchable with respect to glass.

If, on the other hand, only 1 $\mu$m of silicon is consumed during the anodic bonding process, the remaining silicon will also function as an etch stop layer, as well as an anodic bonding layer. The HF or Buffered Oxide Etch (B.O.E.) will remove the silicon dioxide, but stop upon reaching the unoxidized silicon. Hence, the layer of silicon used for layer 27 will both effectively bond the glass sheets together, and terminate the etch process.

In one embodiment of the process of the present invention, a thin film layer 27 is sputtered or otherwise deposited on both sides of each sheet of glass 28. The thickness of the film layer 27 is between 1.5 μm and 3 μm. As mentioned above, the thin film layer 27 will function as an intermediate anodic bonding layer, a hard mask, and/or an etch stop layer.

The glass sheets 28 having layer 27 disposed thereon may be patterned before or after they are anodically bonded to other glass sheets 28. When the verb "patterned" is employed in this description, or in the appended claims, it is intended to inclusively refer to the multiple steps of depositing a photoactive layer, such as a photoresist, on top of a structural layer, exposing and developing the photoactive layer to form a mask pattern on top of the structural layer, and finally, selectively removing portions of the structural layer which are exposed by the mask pattern by a material removal process, such as wet chemical etching, reactive-ion etching, or reactive sputtering, in order to transfer the mask pattern to the etchable layer.

In one embodiment, each of the individual glass sheets 28 is patterned, and preferably wet etched, before the sheets are anodically bonded to each other. This minimizes the amount of undercut experienced by each glass sheet 28. After the etch step, each glass sheet 28 is anodically bonded to the other glass sheets 28 using an alignment mark, thereby forming a multilayered stack or template 30.

Alternatively, the structure of FIG. 4 can be achieved through continuous litho-patterning and wet etching of a multi-layered stack of anodically bonded glass sheets 28. In this embodiment, a thin film layer 27 is also sputtered or otherwise deposited on both sides of each sheet of glass 28. However, prior to patterning and etching, the glass sheets 28 are anodically bonded together, thereby forming a multi-layered stack.

The stack is then photolithographically patterned, and etched, preferably using a wet etch. The etch process is selective such that it stops on the first intermediate layer 27. Then, another etch is performed to remove the exposed first intermediate layer material 27, and then the second glass sheet layer 28 is etched. Since this etch is also selective, the process stops when it reaches the second intermediate layer 27, and so on, until the apertures are formed through the entire stack to create the template 30, as shown in FIG. 4.

If a hard mask layer is employed as an intermediate layer 27 then, alternatively, a dry or plasma etch can be used to form the apertures in that embodiment of the invention. Chromium is one example of a hard mask.

Based on the results shown in FIG. 4, the process of the present invention is a significant improvement over conventional processes by maintaining small critical dimensions.

After the spacer structures 18 are arranged in the template 30, they must be aligned and attached to an electrode plate of a display device. Another novel aspect of the process of the present invention provides for the use of anodic bonding in combination with a template 30 in order to align and attach the spacer structure to the faceplate or baseplate of a display device.

Figure 5:
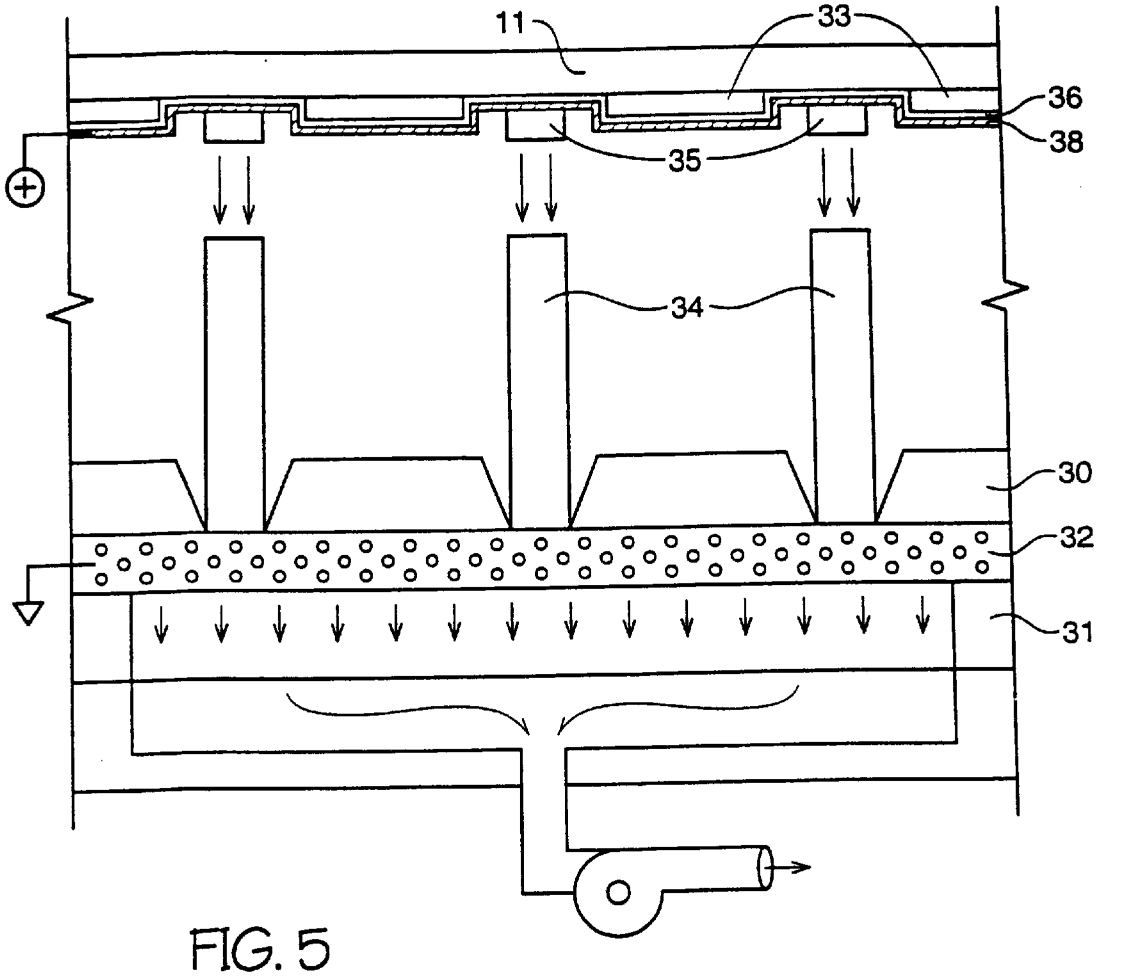
FIG. 5 is a schematic cross-section of a display baseplate positioned opposite the template of the present invention having a spacer structure disposed therein, according to one embodiment of the present invention.

FIG. 5 shows a template, generally represented at 30, which is preferably a multi-layered template made according to the process of the present invention. Alternatively, a prior art single-layered template may be used.

The spacer fibers 34, which are placed in the apertures of template 30, are preferably made of glass materials which have mobile ions, such as, sodium, potassium, lead, etc., which are necessary for the anodic bonding process. Sample materials, include, but are not limited to soda lime glass and potassium rubidium glass. Currently, lead oxide silicate glasses are used for the spacer fibers 34, and have the following chemical compositions: 35–45% PbO; 28–35% $SiO_2$; balance $K_2O$; $Li_2O$; and RbO.

A perforated conductive plate 32 contacts the underside of the template 30. The perforated conductive plate 32 is preferably comprised of a material such as graphite, and preferably has a flat upper surface in order to make intimate contact with the ends of the spacer fibers 34 disposed in the apertures of template 30. A supporting structure 31 is used to force the path of airflow in an outward direction, in order to maintain the attachment of the spacer fibers 34 to the perforated conductive plate 32. This is done by applying a vacuum to the underside of the perforated conductive plate 32.

In the first example, the spacer fibers 34 are aligned to the baseplate of the display. Anodic bond sites 35, which are located on the electrode plate 11, are comprised of silicon, aluminum, or other material which can form a stable oxide during the anodic bonding process, such as, for example, nickel. The area 33 is comprised of emitter tips. The passivation layer 36, comprised of a material such as a nitride or an oxide layer, is disposed over the emitter tip area 33 to protect them, as well as the rest of the baseplate surface. As described above, the baseplate 21 preferably comprises a glass substrate electrode plate 11. A conductive thin film layer 38 (such as aluminum, chrome, or other metal layer) is located on top of the passivation layer 36, and is used to generate an electrical field during the anodic bonding step.

In preparation for anodic bonding, the negative (or ground) electrode is connected to the perforated conductive plate 32, and the positive electrode is connected to the conductive thin film layer 38. Then either one of the plates (top or bottom) is brought in close to the other in order to form intimate contact between the bond sites 35 and the spacer fibers 34. The anodic bonding process is then initiated at a recommended temperature usually in the range of 200° C. to 500° C., and the preferred temperature is about 300° C. The temperature is dependent on the strength of the voltage and the amount of mobile ions which are present at the bonding site, and will therefore vary with those parameters.

The amount of mobile ions is measured as a percentage of the mobile ions in the oxide. A suitable amount of mobile ions is 1–15% sodium ions in glass, with a preferred amount being about 7%. Using such a glass, a sample voltage is in the range of 150–1000 volts, and preferably about 700 volts.

Figure 6:
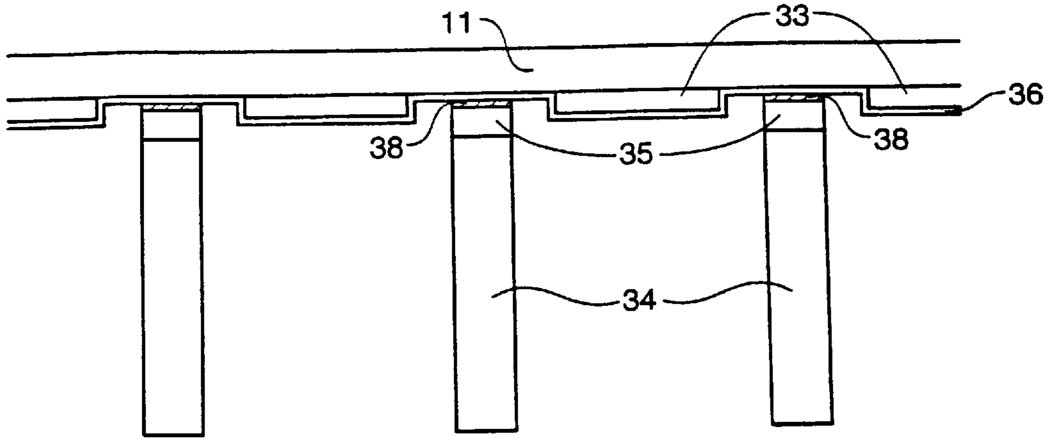
FIG. 6 is a schematic cross-section of the display baseplate of FIG. 5, after the spacer structures have been adhered thereto, according to the process of the present invention.

An etch step (dry or wet) is applied to remove the conductive thin film layer 38 after the anodic bonding process. Sample etchants include, but are not limited to HF or B.O.E. FIG. 6 shows the result of the anodic bonding process of the spacer fibers 34 to the baseplate 21. If the spacer fibers 34 are located outside of one of the bond sites 35, a bond will not be formed between bond sites 35 and spacer fibers 34. Therefore, a self-aligned system of spacers to baseplate is achieved.

Figure 7:
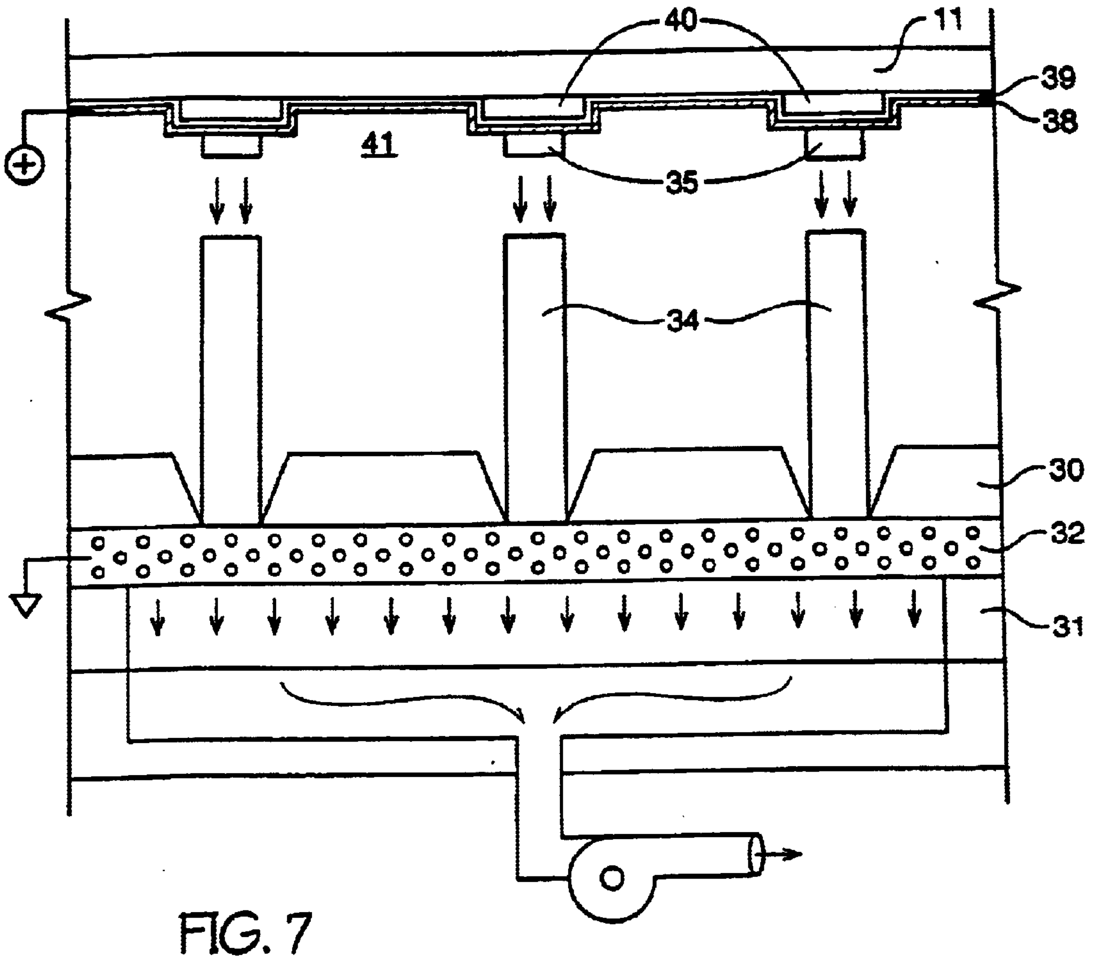
FIG. 7 is a schematic cross-section of a display faceplate positioned opposite the template of the present invention having a spacer structure disposed therein, according to an alternative embodiment of the present invention.

Referring to FIG. 7, an alternative embodiment of the present invention is shown in which the use of the faceplate of the display is illustrated. There is a sub-pixel area 41 for each glass of the faceplate. A black matrix structure 40, which is used to enhance contrast of the display image, is located between the sub-pixel areas 41. A transparent conductive layer 39, which is preferably comprised of a material such as indium tin oxide (ITO), is conformally deposited over the display face. A conductive thin film layer 38 is then conformally deposited over the transparent conductive layer 39. Again, preparatory to anodic bonding, a negative (or ground) electrode is connected to the perforated conductive plate 32, and a positive electrode is connected to the conductive thin film layer 38.

Then either side of the plate (top or bottom) is brought in close contact to the other in order to form intimate contact between bond sites 35 and spacer fibers 34. To initiate the anodic bonding process, usually a temperature range of 200° C. to 500° C. is recommended, depending on how high the voltage and how high the content of mobile ions which are present.

Figure 8:
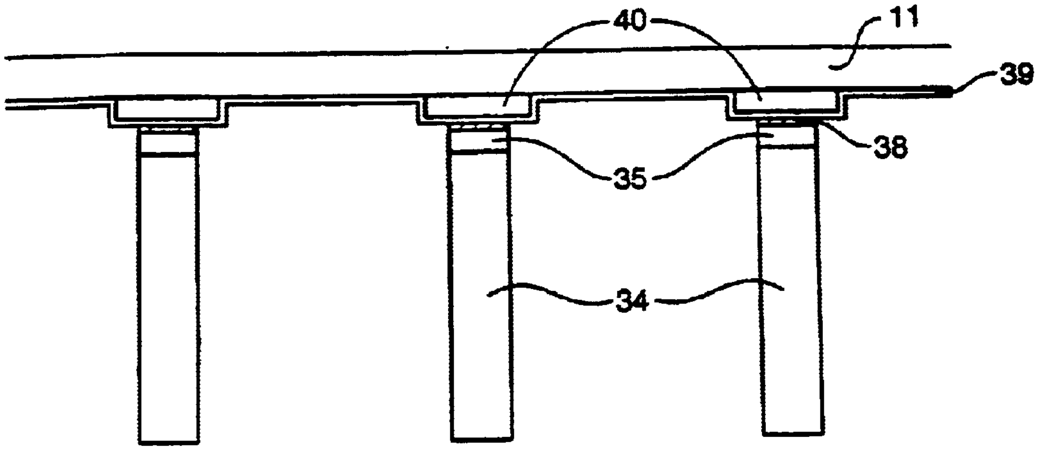
FIG. 8 is a schematic cross-section of the display baseplate of FIG. 7, after the spacers structures have been adhered thereto, according to the alternative process of the present invention.

As before, an etch step (dry or wet) is applied to remove the conductive thin film layer 38 outside of the bond sites after the anodic bonding process is complete. FIG. 8 shows the result of the anodic bonding process after the majority of this conductive thin film layer 38 has been removed. If the spacer fibers 34 fall outside of the bond sites 35, no bond will form between bond sites 35 and spacer fibers 34. Therefore, again a self-aligned system of spacer fibers 34 to baseplate is achieved.

During the anodic bonding process, the spacer fibers 34 which are located on the passivation layer 36 or conductive transparent layer 39, such as ITO, will not create an anodic bond because an such a bond can not be generated on nitride and/or oxide surfaces. Therefore, after the anodic bonding process is complete, only the spacer fibers 34 located on top of the bond sites 35 will remain on the baseplate or the faceplate, as seen in FIGS. 6 and 8.

Once the spacer structures have been adhered to either a faceplate or a baseplate, the complimentary electrode is attached, the display device is sealed, and a vacuum is created between the electrode plates within the display, as seen in FIG. 1.

While the particular process, as herein shown and disclosed in detail, is fully capable of obtaining the objects and advantages herein before stated, it is to be understood that it is merely illustrative of embodiments of the invention, and that no limitations are intended to the details of the construction or the design herein shown, other than as described in the appended claims.

One having ordinary skill in the art will realize that, even though a field emission display was used as an illustrative example, the process is equally applicable to other vacuum displays (such as gas discharge (plasma) and flat vacuum fluorescent displays), and other devices requiring physical supports in an evacuated cavity.

What is claimed is:

1. A multi-layered template comprising:

a first glass layer having a first side and another side;

a hard mask layer covering the first side of the first glass layer, and a first anodic bonding layer covering the another side of the first glass layer, the first anodic bonding layer comprising at least one of silicon dioxide, aluminum dioxide, and nickel oxide.

2. The multi-layered template of claim 1, further comprising:

a second glass layer having a top side and a bottom side, the top side of the second glass layer being adhered to said another side of the first glass layer with the first anodic bonding layer disposed therebetween; and a second anodic bonding layer covering the bottom side of the second glass layer.

3. The multi-layered template of claim 2, wherein a pattern of openings, each extending through the hard mask layer, the first glass layer, and the first anodic bonding layer.

4. The multi-layered template of claim 3, wherein the pattern of openings further each extend through the second glass layer and the second anodic bonding layer.

5. The multi-layered template of claim 2, further comprising a perforated conductive plate attached to the second anodic bonding layer.

6. The multi-layered template of claim 2, wherein the second anodic bonding layer comprises at least one of silicon, aluminum, and nickel.

7. The multi-layered template of claim 1, wherein the hard mask layer comprises chromium.

8. A method for manufacturing a multi-layered template, comprising:

providing a first glass layer and a second glass layer;

sputtering a film on each of the first glass layer and the second glass layer;

anodically bonding the first glass layer to the second glass layer to form a multi-layered glass sheet;

patterning the multi-layered glass sheet; and etching the multi-layered glass sheet to form openings therein in accordance with the patterning.

9. The method for manufacturing a multi-layered template according to claim 8, wherein the etching comprises wet etching.

10. The method for manufacturing a multi-layered template according to claim 9, wherein the etching is a multi-step process.

11. The method for manufacturing a multi-layered template according to claim 9, further comprising extending the openings through the multi-layered glass sheet.

12. The method for manufacturing a multi-layered template according to claim 8, wherein the etching comprises plasma etching.

13. The method for manufacturing a multi-layered template according to claim 8, wherein the anodic bonding causes the film to oxidize.

* * * * *

UNITED STATES PATENT AND TRADEMARK OFFICE

CERTIFICATE OF CORRECTION

PATENT NO. : 6,716,081 B1
DATED : April 6, 2004
INVENTOR(S) : Woo-Joo Kim et al.

It is certified that error appears in the above-identified patent and that said Letters Patent is hereby corrected as shown below:

Column 2,
Line 12, change “multilayered” to -- multi-layered --
Line 52, change “spacers” to -- spacer --

Column 3,
Line 20, after “thereto.” begin a new paragraph with “The”
Line 21, change “spacers” to -- spacer --

Column 4,
Line 32, after “will” delete “be”

Column 5,
Line 32, change “multilayered” to -- multi-layered --

Column 7,
Line 29, after “because” delete “an”
Line 35, change “complimentary” to -- complementary --

Signed and Sealed this

Sixteenth Day of November, 2004

JON W. DUDAS
*Director of the United States Patent and Trademark Office*